United States Patent
Gallo et al.

(10) Patent No.: US 10,212,406 B2
(45) Date of Patent: Feb. 19, 2019

(54) IMAGE GENERATION OF A THREE-DIMENSIONAL SCENE USING MULTIPLE FOCAL LENGTHS

(71) Applicant: NVIDIA Corporation, Santa Clara, CA (US)

(72) Inventors: Orazio Gallo, Santa Cruz, CA (US); Jan Kautz, Lexington, MA (US); Abhishek Haridas Badki, Goleta, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 74 days.

(21) Appl. No.: 15/381,010

(22) Filed: Dec. 15, 2016

(65) Prior Publication Data

US 2018/0176532 A1   Jun. 21, 2018

(51) Int. Cl.
*H04N 5/232*     (2006.01)
*H04N 13/111*    (2018.01)
*H04N 13/128*    (2018.01)
*H04N 13/271*    (2018.01)

(52) U.S. Cl.
CPC ....... *H04N 13/111* (2018.05); *H04N 5/23216* (2013.01); *H04N 5/23296* (2013.01); *H04N 13/128* (2018.05); *H04N 13/271* (2018.05)

(58) Field of Classification Search
CPC .. H04N 13/111; H04N 13/128; H04N 13/271; H04N 13/0011; H04N 5/23216; H04N 13/0271; H04N 5/23296; H04N 13/0022
USPC .......................................................... 348/46
See application file for complete search history.

(56) References Cited

U.S. PATENT DOCUMENTS

| 2013/0002656 | A1* | 1/2013 | Zhang | H04N 13/161 345/419 |
| 2013/0016096 | A1* | 1/2013 | Kwon | H04N 13/261 345/419 |
| 2013/0293690 | A1* | 11/2013 | Olson | H04N 13/341 348/56 |

(Continued)

OTHER PUBLICATIONS

Saha et al, A system for near real time 3D reconstruction from multi-view using 4G enabled mobile (Year: 2014).*

(Continued)

*Primary Examiner* — Shan E Elahi
(74) *Attorney, Agent, or Firm* — Zilka-Kotab, P.C.

(57) ABSTRACT

A system and method for computational zoom generates a resulting image having two or more effective focal lengths. A first surface within a three-dimensional (3D) scene including a first and second set of 3D objects defined by 3D information is identified. The first and second sets of 3D objects are located within first and second depth ranges of the 3D scene, respectively. The first set of 3D objects is projected onto the first surface according to a first projection mapping to produce a first portion of image components. The second set of 3D objects is projected onto the first surface according to a second projection mapping to produce a second portion of image components. The resulting image comprising the first portion of image components and the second portion of image components is generated based on a camera projection from the first surface to a camera view plane.

20 Claims, 12 Drawing Sheets

(56) References Cited

U.S. PATENT DOCUMENTS

| | | | |
|---|---|---|---|
| 2014/0168367 A1* | 6/2014 | Kang | G06T 7/85 348/46 |
| 2016/0080717 A1* | 3/2016 | Reiss | H04N 13/361 348/43 |
| 2016/0335796 A1* | 11/2016 | Roimela | G06T 17/05 |

OTHER PUBLICATIONS

Childress, A., "Exploring How Focal Length Affects Images," May 12, 2011, pp. 1-13, retrieved from https://photography.tutsplus.com/tutorials/exploring-how-focal-length-affects-images-photo-6508.

Bell, S. et al., "A Non-Linear Filter for Gyroscope-Based Video Stabilization," 2014, pp. 1-15.

* cited by examiner

IMAGE GENERATION OF A THREE-DIMENSIONAL SCENE USING MULTIPLE FOCAL LENGTHS

FIELD OF THE INVENTION

The present invention relates to multi-perspective zoom in computational photography, and more particularly to systems and methods for computational zoom.

BACKGROUND

Digital cameras are typically configured to capture a digital image or digital video of a photographic scene. An optical lens assembly focuses an incoming light field from the photographic scene onto an electronic image sensor, configured to generate an electronic representation of the photographic scene. The electronic representation may be converted to a digital image, or sequence of digital images comprising a digital video.

The optical lens assembly typically focuses items within a field of view of the photographic scene, according to a focal length of the optical lens assembly. Photographers conventionally employ lens focal length (zoom), and the physical position of a digital camera to provide appropriate perspective to capture a desired image. However, positioning the digital camera in the appropriate perspective is not always practical. Furthermore a different perspective may be needed after an image is captured and the photographic scene has changed.

Videographers sometimes employ a dolly rail apparatus to control camera position, along with a predetermined lens profile for zoom and focus to maintain the appearance of a foreground subject's size in the video sequence while changing the perspective relative to a scene background. This technique is referred to in the art as the dolly zoom. However, a dolly apparatus and/or a camera lens with a precisely controllable variable focal length are not always available or practical in common video capture settings, such as video capture with a mobile device or smart phone. Thus, there is a need for addressing these issues and/or other issues associated with the prior art.

SUMMARY

A system and method are disclosed for performing computational zoom. The method comprises identifying a first surface within a three-dimensional (3D) scene, where the 3D scene includes a first set of 3D objects located within a first depth range of the 3D scene and a second set of 3D objects located within a second depth range of the 3D scene, and 3D information defines the first set of 3D objects and the second set of 3D objects. A first set of 3D objects is projected onto the first surface according to a first projection mapping to produce a first portion of image components. A second set of 3D objects is projected onto the first surface according to a second projection mapping to produce a second portion of image components. A resulting image is generated that comprises the first portion of image components and the second portion of image components based on a camera projection from the first surface to a camera view plane.

DETAILED DESCRIPTION

Figure 1A:
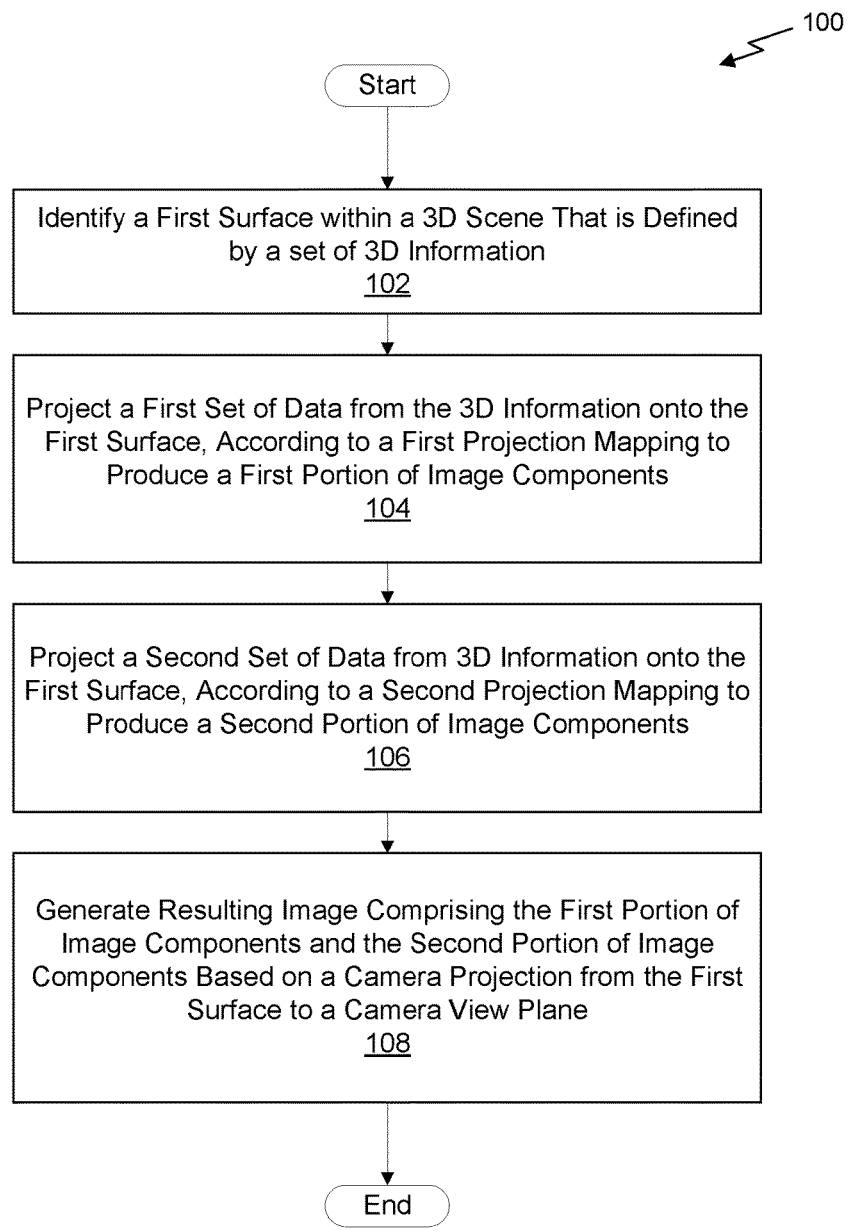
FIG. 1A is a flowchart of a method for performing a computational zoom operation, in accordance with one embodiment.

In the context of computational photography, the present disclosure introduces computational zoom, a process of algorithmically generating images having one or more specified focal lengths. Computational zoom is not conventional digital zoom, which essentially up-samples a cropped portion of an image while preserving any perspective relationships among objects within the image. Instead, computational zoom provides for generating images while controlling the perspective relationships between objects disposed within a scene at different distances from a camera position.

Computational zoom techniques disclosed herein may be implemented within inexpensive camera devices and mobile devices. Certain embodiments may allow users to capture a set of digital images (e.g., using one or more built-in digital camera modules) and generate computational zoom images from the set of digital images. The set of digital images may comprise frames within a video sequence or digital images captured by a plurality of different digital camera modules included within a mobile device. Furthermore, in one embodiment, a plurality of different video sequences, each separately captured by the plurality of different digital camera modules within a mobile device may be combined using computational zoom techniques disclosed herein to generate a video sequence of images according to one or more specified camera attributes. The specified camera attributes may include, without limitation, a camera position, a camera focal length, a set of combined camera focal lengths, or a combination thereof.

In one embodiment, a set of digital images is captured from different camera positions (points of view). The set of digital images may be processed to generate 3D information that models a 3D scene. After modeling the 3D scene, a resulting image may be generated from an arbitrary camera position. Furthermore, the resulting image may be generated to have different focal lengths for different depth regions from the camera position. For example, a surface oriented to generally face the camera position may define a boundary between two portions of the 3D scene. A near portion of the 3D scene includes objects between the camera position and the surface, while a far portion of the 3D scene includes objects more distant from the camera than the surface. Objects disposed within the far portion of the 3D scene may be projected onto the surface using a first effective focal length, while objects disposed within the near portion of the 3D scene may be projected using a second, independent effective focal length. Objects in the near portion of the 3D scene may be projected onto the surface, or equivalently, projected onto a camera view surface at the camera position. In certain embodiments, the 3D scene may be further divided by two or more surfaces, for example to provide transitions between effective focal lengths that appear smoother or to create layered perspective relationships. In one embodiment, the surface may comprise a plane. In another embodiment the two or more surfaces may comprise a set of two or more planes. The two or more planes may be parallel or not parallel to each other. Furthermore, the two or more planes may be parallel or not parallel to a camera view plane.

In certain embodiments, the 3D scene is defined by a 3D digital model and the 3D information represents various aspects of the 3D digital model. A camera position may be arbitrarily specified and a resulting image may be generated by performing a rendering operation on the 3D scene. Furthermore, the surface may be arbitrarily defined within 3D scene and the computational zoom techniques disclosed herein may be performed to generate resulting images having two or more effective focal lengths. The techniques disclosed herein may be implemented as part of a 3D software engine, which may include a camera object configurable to render a given 3D scene according to two or more effective focal lengths.

FIG. 1A is a flowchart of a method 100 for performing a computational zoom operation, in accordance with one embodiment. Although the method 100 is described in conjunction with the systems of FIGS. 2-5, any system that implements method 100 is within the scope and spirit of embodiments of the present invention. For example, in one embodiment, method 100 is performed by a mobile device such as a smart phone or tablet computer. In another embodiment, method 100 is performed by a workstation, such as a laptop or desktop computer. In yet another embodiment, method 100 is performed by a server system. More generally, a processing unit included within a computation system may be configured to perform method 100.

At step 102, the processing unit may identify a first surface within a 3D scene, where the 3D scene is defined by a set of 3D information. The 3D information may include, without limitation, 3D geometric objects such as shapes, polygons, points, and the like, and shading information such as color or texture attributes corresponding to vertices of the shapes. In one embodiment, the 3D information includes two or more images and an estimated camera position for each of the two or more images. The first surface may define a boundary separating a near portion of the 3D scene from a far portion of the 3D scene. The near portion of the 3D scene includes 3D information disposed between a camera view plane and the first surface, while the far portion of the 3D scene includes 3D information disposed more distant from the camera view plane than the first surface. In one embodiment, the first surface comprises a plane.

In one embodiment, an image of the 3D scene is presented to a user on a display screen (display device), and identifying the first surface comprises receiving a selection operation, such as a touch gesture input at a screen location indicated by a user. The touch gesture input may be detected by a touch input device, such as a capacitive input sensor coupled to the display screen. More generally, the screen location may be specified by a selection operation performed using any technically feasible pointing device, such as the capacitive input sensor, a mouse, a track pad, and so forth. For example, a touch gesture may specify the screen location using the capacitive input sensor, a mouse click may specify the screen location using a mouse, and a tap operation may specify the screen location using a track pad. A depth value associated with the screen location may, at least in part, specify the first surface. For example, the depth value may identify the first surface as a plane that is parallel to the display screen and disposed at the depth value. Using the screen location and a depth map for the 3D scene, the processing unit may determine a depth associated with the screen location. In one embodiment, the depth map comprises a two-dimensional (2D) array of elements that specify a depth value for a 2D coordinate within the depth map. The depth map may be configured to represent a depth value for each screen location, and may provide a depth for each pixel of the screen. The first surface may then be positioned at the determined depth within the 3D scene. In one embodiment, the first surface is a plane and the plane is positioned at the determined depth from the camera view plane, which may geometrically correspond to at least a portion of the display screen. Furthermore, the depth may be specified or adjusted using a user interface input, such as a pinch gesture, a slide gesture, or a user interface widget such as a slider control, or any other technically feasible user interface input technique. In this way, specifying a depth identifies the first surface as a plane at the depth. An additional touch gesture input may indicate a second location, which may be used to tilt, bend, or otherwise modify geometry and/or orientation of the first surface.

At step 104, the processing unit projects a first set of data from the 3D information onto the first surface, according to a first projection mapping to produce a first portion of image components. In one embodiment, the first set of data includes 3D information located within a first depth range within the 3D scene comprising the near portion of the 3D scene. The first portion of image components may include pixel color and/or intensity values geometrically associated with points on the first surface, the point locations determined by the first projection mapping. The first portion of image components may further include depth information, such as a depth for each point location. In one embodiment, the first projection mapping comprises a homography operator.

At step 106, the processing unit projects a second set of data from the 3D information onto the first surface, according to a second projection mapping to produce a second portion of image components. In one embodiment, the second set of data includes 3D information located within a second depth range within the 3D scene comprising the far portion of the 3D scene. The second portion of image components may include pixel color and/or intensity values geometrically associated with points on the first surface, the point locations determined by the second projection mapping. The second portion of image components may further include depth information, such as a depth for each point location. In one embodiment the second projection mapping comprises a homography operator.

A focal length for the near portion of the 3D scene and a focal length for the far portion of the 3D scene may be specified, indicated, or otherwise entered by the user, such as using pinch gesture, a slide gesture, or a user interface widget such as a slider control, or any other technically feasible user interface input technique. For example, the far portion of the 3D scene may be zoomed in or out using a pinch gesture to indicate zoom, and implicitly focal length for the far portion of the 3D scene. Specifying or adjusting the first focal length specifies the first projection mapping accordingly, and specifying or adjusting the second focal length specifies the second projection mapping accordingly.

At step 108, the processing unit generates a first resulting image comprising the first portion of image components and the second portion of image components based on a camera projection from the first surface to the camera view plane. In one embodiment, the first portion of image components and second portion of image components are combined and sorted according to depth from the camera view plane.

In alternative embodiments, step 104 is subsumed into step 108, such that generating the first resulting image includes projecting the first set of data from the 3D information onto the camera view plane.

In one embodiment, a video sequence may be generated comprising at least the first resulting image and a second resulting image. The second resulting image may be generated according to steps that follow the steps of method 100, with modifications to one or more of the first projection mapping, the second projection mapping, the camera projection, a position for the camera view plane, the position of the first surface, and so forth. For example, when generating the second resulting image, the second projection mapping in step 106 may be modified to produce a different zoom level (focal length) for the second set of data from the 3D information. Furthermore, additional resulting images may be similarly generated, for example as sequential video frames comprising the video sequence.

In one embodiment, a second surface may be included within the 3D scene. The second surface may be disposed behind the first surface relative to the camera view plane, or the second surface may be disposed in front of the first surface relative to the camera view plane. In one embodiment the first surface is a plane and the second surface is a plane; furthermore, the depth of the second surface may be a function of the depth of the first surface. For example, the second surface may be disposed at a depth that is a fixed offset from the first surface. In another example, the second surface may be disposed at a ratio of the depth of the first surface (e.g., five percent further from the camera view plane than the first surface). In another embodiment, the second surface may be identified and positioned through a user interface input such as a pinch gesture or a swipe gesture. The second surface may be initially identified as an offset surface relative to the first surface. The user may enter a gesture to modify the depth or other aspects of the second surface. For example, the user may pinch in or pinch out to identify a new depth for the second surface. In one embodiment, the user may also tilt, warp, or otherwise modify the second surface.

Figure 1B:
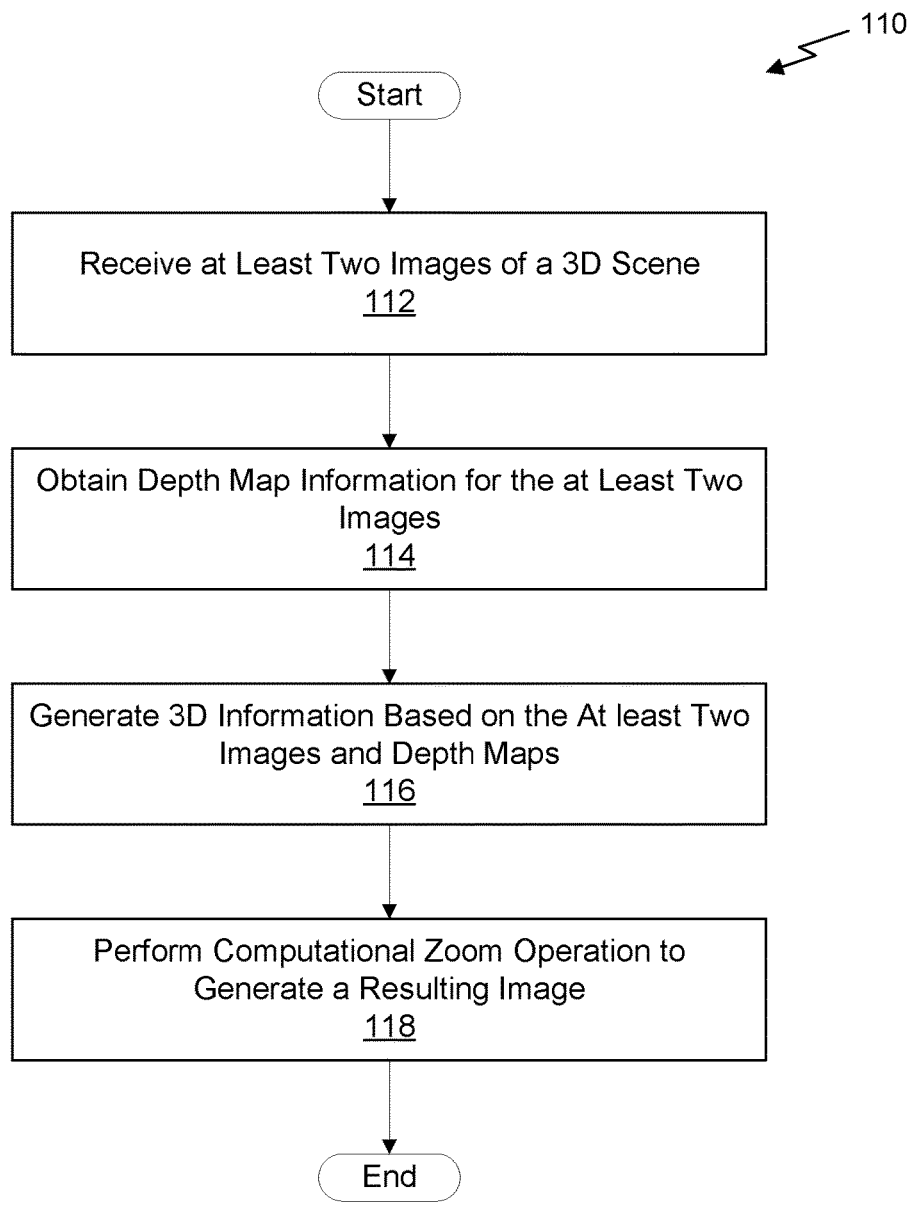
FIG. 1B is a flowchart of a method for generating a resulting image having an artificial focal length, based on two or more images of a three-dimensional (3D) scene, in accordance with one embodiment.

FIG. 1B is a flowchart of a method 110 for generating a resulting image having a specified focal length, based on two or more images of a three-dimensional (3D) scene, in accordance with one embodiment. Although the method 110 is described in conjunction with the systems of FIGS. 2-5, any system that implements method 110 is within the scope and spirit of embodiments of the present invention. For example, in one embodiment, method 110 is performed by a mobile device such as a smart phone or tablet computer. In another embodiment, method 110 is performed by a workstation, such as a laptop or desktop computer. In yet another embodiment, method 110 is performed by a server system. More generally, a processing unit included within a computation system may be configured to perform method 100.

At step 112, the processing unit receives at least two images of a 3D scene. The images may be captured by a digital camera included in the mobile device as sequentially captured digital photographs or sequential video frames in a digital video clip. In practice, the at least two images should be captured using different camera positions, such as at different distances from a photographic subject or subjects. For example, the at least two images of the 3D scene may be captured at two different locations along the principal axis for the digital camera.

At step 114, the processing unit obtains depth map information for the at least two images. In one embodiment, the depth map information comprises a depth map for each of the at least two images. Furthermore, each depth map includes a two-dimensional array of depth values, with each pixel in a corresponding image associated with one of the depth values. In one embodiment, the depth map information is obtained by estimating depth from parallax observed between the at least two images. In another embodiment, the depth map information is obtained by a depth-sensing image sensor, configured to capture a depth map in conjunction with the digital camera capturing each of the at least two images. In yet another embodiment, the depth map information is obtained from a rendered depth buffer.

At step 116, the processing unit generates 3D information based on the at least two images and depth maps. Any technically feasible technique or techniques may be implemented to generate the 3D information. For example, one type of technique known as structure from motion may be implemented to generate 3D information based on at least a sequence of images. In one embodiment, the 3D information includes estimated camera position for each of the at least two images.

At step 118, the processing unit performs a computational zoom operation to generate a resulting image. In one embodiment, the computational zoom operation comprises method 100 of FIG. 1A.

Figure 1C:
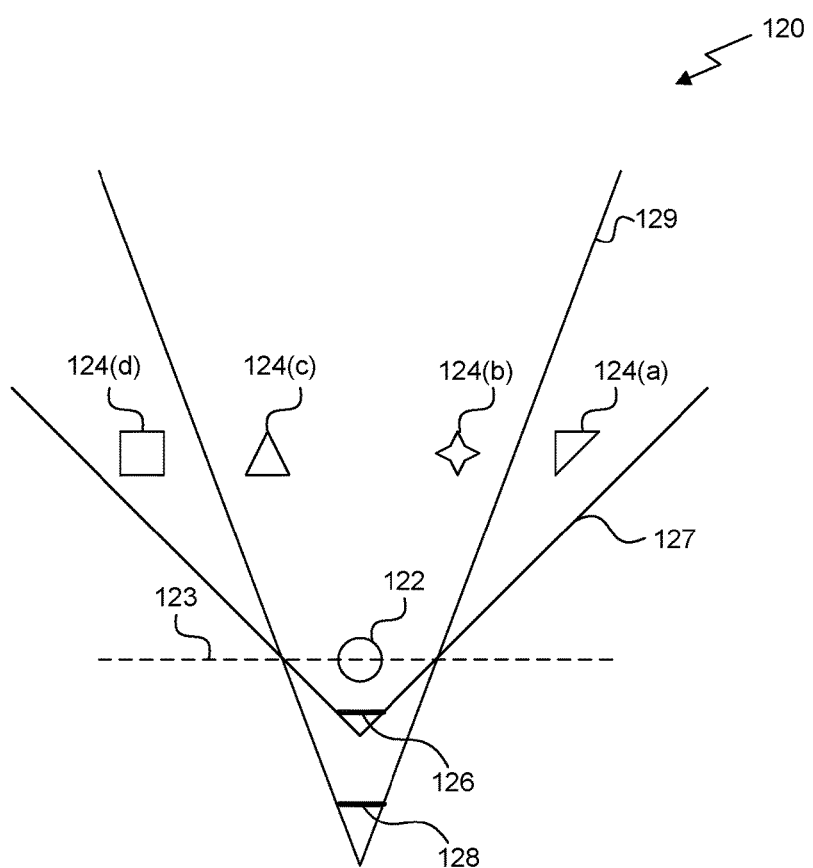
FIG. 1C illustrates a 3D scene viewed from two different camera positions and two different focal lengths, in accordance with one embodiment.

FIG. 1C illustrates a 3D scene 120 viewed from two different camera positions and two different focal lengths, in accordance with one embodiment. As shown, a first camera 126 located at a first camera position is configured to have a first focal length with a first view frustum 127. A view frustum, such as view frustum 127, defines a volume projection starting at a camera view plane and continuing into a 3D scene. The interior volume of the view frustum defines what may be visible (if not occluded) within the 3D scene, while everything outside the view frustum is not within the field of view of the camera. The view frustum may be specified by a focal length (zoom), which may define the field of view from the perspective of the camera. As shown, a second camera 128 located at a second camera position is configured to have a second focal length with a second view frustum 129. In this exemplary configuration, the second focal length is larger than the first focal length. A first surface 123 is formed at the intersection of the first view frustum 127 and the second view frustum 129. Any objects located at the first surface 123 will appear to be the same size when viewed through both first view frustum 127 and the second view frustum 129. For example, a foreground object 122 is shown located along an intersection of first surface 123; consequently, the foreground object 122 will generally appear to be the same size when viewed through either first view frustum 127 or the second view frustum 129. As shown, 3D scene 120 includes four objects 124(a)-124(d) disposed in background positions, behind foreground object 122 and behind the first surface 123. Only objects 124(b) and 124(c) are visible within the second view frustum 129, while objects 124(a)-124(d) are visible within the first view frustum 127.

In one embodiment, the first surface 123 is a plane and the first view frustum 127 and the second view frustum 129 intersect to form a planar rectangular region that intersects the foreground object 122.

In one embodiment, the first surface of the method 100 comprises the surface 123, and the camera view plane of the method 100 comprises a view plane for the camera 126. Furthermore, the first projection mapping of the method 100 projects objects in a near portion of the 3D scene 120 between the surface 123 and either the camera 126 or the camera 128, and the second projection mapping of the method 100 projects objects in a far portion of the scene 120 behind the surface 123. As shown, foreground object 122 intersects surface 123 and therefore may exist partially within both the near portion of the 3D scene and the far portion of the 3D scene. In one embodiment, a near portion of object 122 is associated with the near portion of the 3D scene and a far portion of object 122 is associated with the far portion of the 3D scene.

Figure 1D:
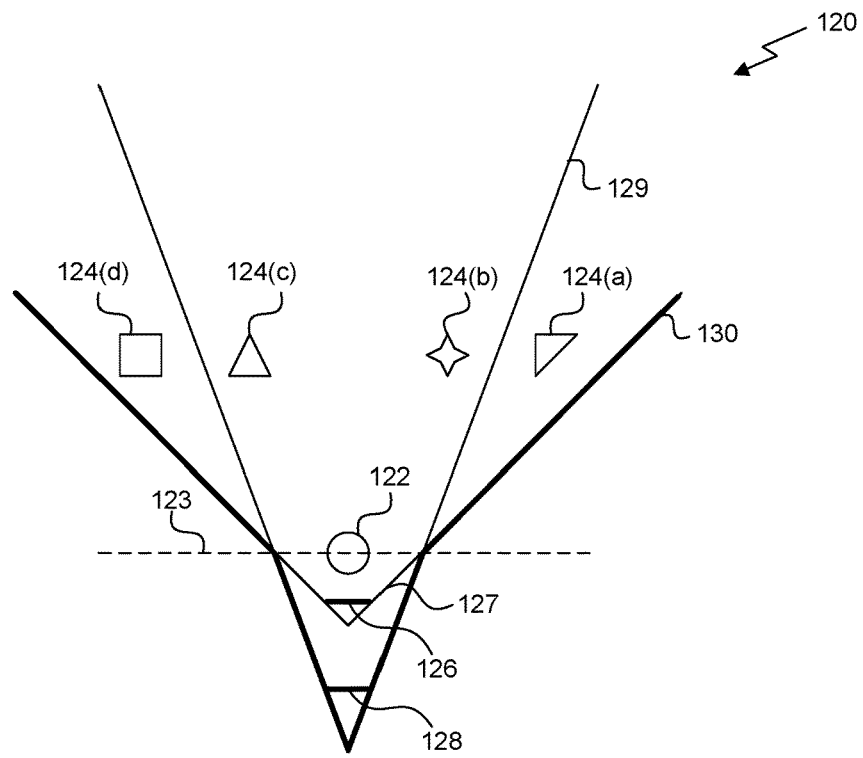
FIG. 1D illustrates a zoom-out step projection, in accordance with one embodiment.
Figure 1D:
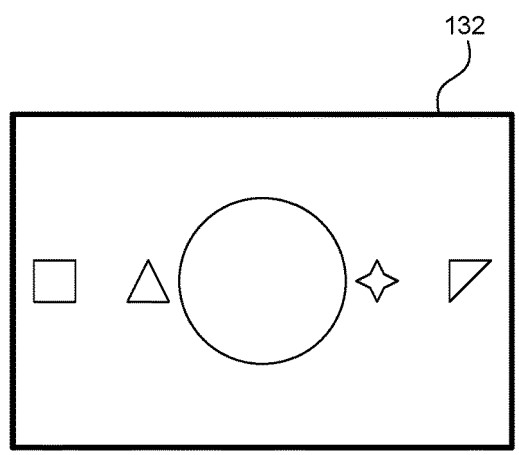

FIG. 1D illustrates a zoom-out step projection, in accordance with one embodiment. As shown, a view volume 130 comprises a section of the second view frustum 129 and a section of the first view frustum 127. A view volume is defined herein to be a geometric combination of two or more sections of different view frustums, each having different focal lengths. A camera configured to view a 3D scene through a view volume may therefore advantageously provide independent perspective control of near objects and far objects within the 3D scene. In the example shown, the view volume 130 includes a section of the second view frustum 129 located between the second camera 128 and the first surface 123, and a section of the first view frustum 127 located on the far side of the first surface 123. Consequently, any objects in the 3D scene 120 disposed between the second camera 128 and the first surface 123 are viewed by the second camera 128 through the second view frustum 129, while any objects disposed on the far side of the first surface 123 are viewed by the second camera 128 through the first view frustum 127. A camera view 132 depicts the 3D scene 120 as viewed by the second camera 128 through the view volume 130. As shown, all four objects 124(a)-124(d) are visible within the camera view 132, as the view volume 130 is forms a wide enough angle to include the four objects 124.

Figure 1E:
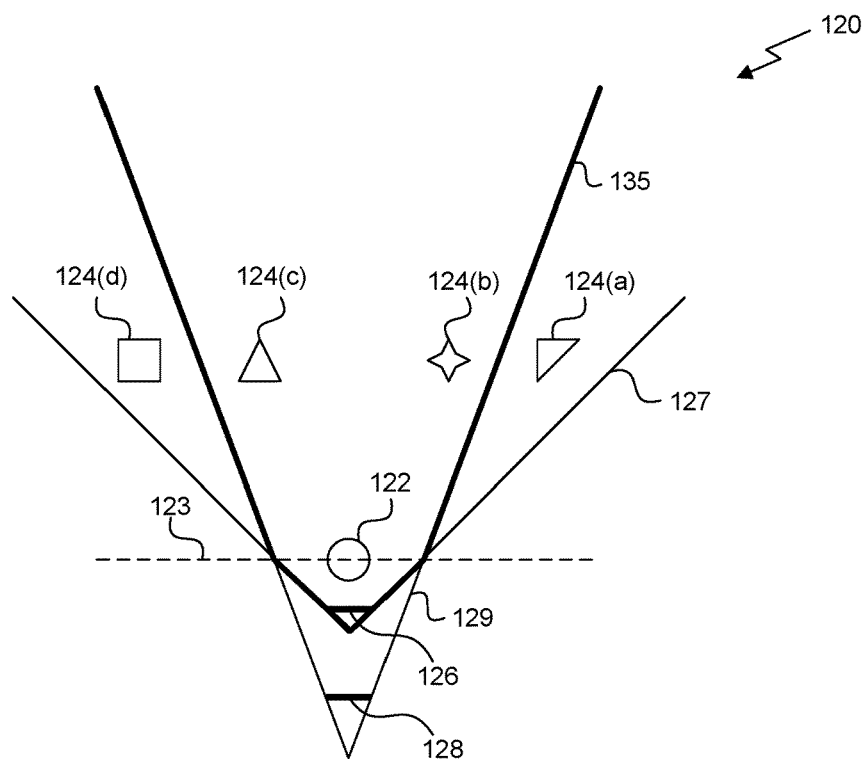
FIG. 1E illustrates a zoom-in step projection, in accordance with one embodiment.
Figure 1E:
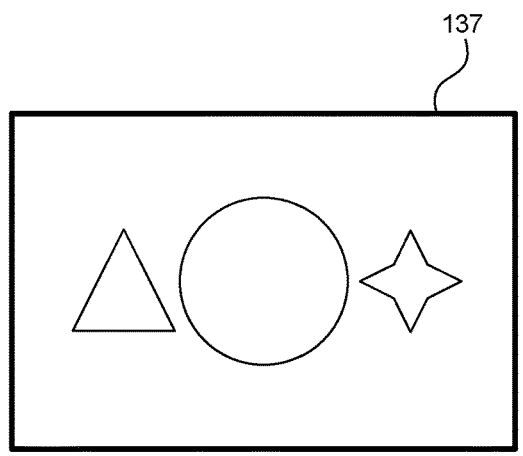

FIG. 1E illustrates a zoom-in step projection, in accordance with one embodiment. As shown, a view volume 135 comprises a section of the second view frustum 129 and a section of the first view frustum 127. More specifically, the view volume 135 includes a section of the first view frustum 127 located between the first camera 126 and the first surface 123, and a section of the second view frustum 129 located on the far side of the first surface 123. Consequently, any objects in the 3D scene 120 disposed between the first camera 126 and the first surface 123 are viewed by the first camera 126 through the first view frustum 127, while any objects disposed on the far side of first surface 123 are viewed by the first camera 126 through the second view frustum 129. A camera view 137 depicts the 3D scene 120 as viewed by the first camera 126 through the view volume 135. As shown, only two of the objects 124 are visible within the camera view 132, as the view volume 135 forms a narrow enough angle to exclude the objects 124(a) and 124(d) from view.

In one embodiment, an image may be generated at a specified camera position between the first camera 126 and the second camera 128. Furthermore, the image may be generated using an arbitrary combination of two or more focal lengths for corresponding view frustums to form an associated view volume having different focal lengths that are each a function of depth from the camera position.

Figure 1F:
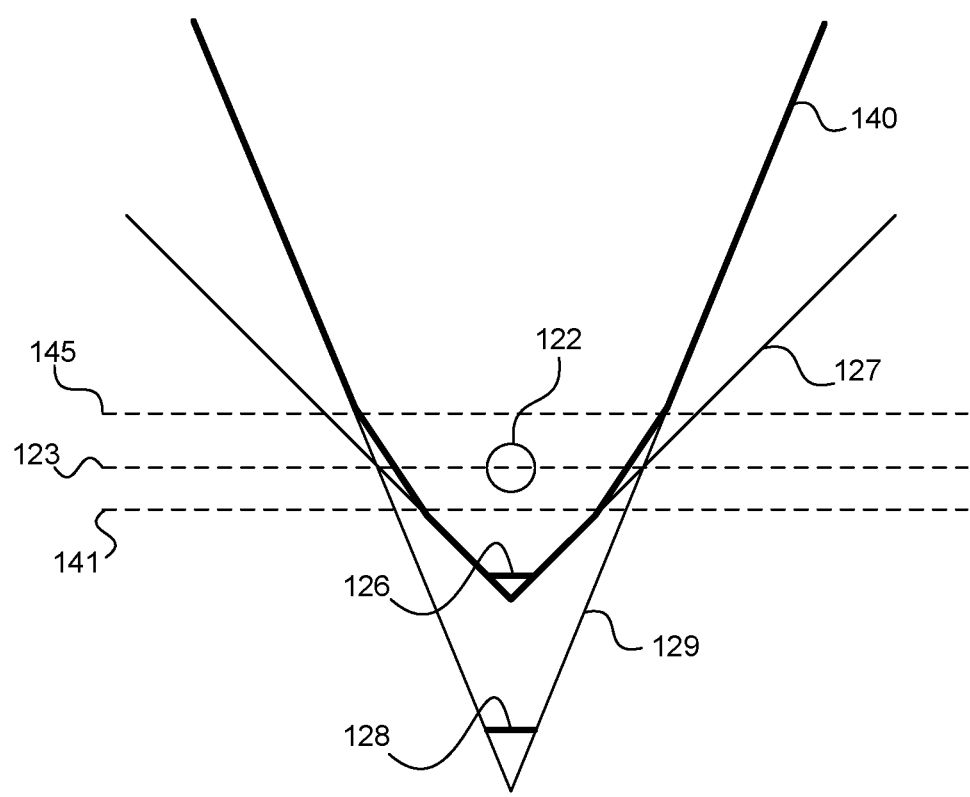
FIG. 1F illustrates a smooth mapping, in accordance with one embodiment.

FIG. 1F illustrates a smooth mapping, in accordance with one embodiment. As shown, the foreground object 122 includes a spatial extent that ranges in depth relative to the first camera 126, and intersects the first surface 123. In the view volume 130 of FIG. 1D and the view volume 135 of FIG. 1E, a sharp transition from one view frustum to a second view frustum at the first surface 123 may lead to visually apparent geometric distortion of foreground object 122. Smooth mapping may be implemented to mitigate such visually apparent geometric distortion. Smooth mapping involves introducing at least one additional surface and at least one additional focal length, which may be associated with an additional view frustum.

A shown, a second surface 141 may be introduced in front of the first surface 123, and a third surface 145 may be introduced behind the first surface 123. An intermediate frustum may be formed between the second surface 141 and the third surface 145. At the second surface 141, the intermediate frustum may intersect the first view frustum 127. At the third surface 145, the intermediate frustum may intersect the second view frustum 129. A view volume 140 for the first camera 126 may be formed to include a portion of the first view frustum 127, the intermediate frustum, and a portion of the second view frustum 129. More specifically, view volume 140 may include a portion of the first view frustum 127 between the first camera and the second surface 141, a portion of the second view frustum 129 behind the third surface 145, and a portion of the intermediate frustum between the second surface and the third surface. In this way, visually apparent geometric distortion of objects passing through the first surface 123 may be mitigated by avoiding hard transitions of the view volume 140 at the first surface 123.

Figure 1G:
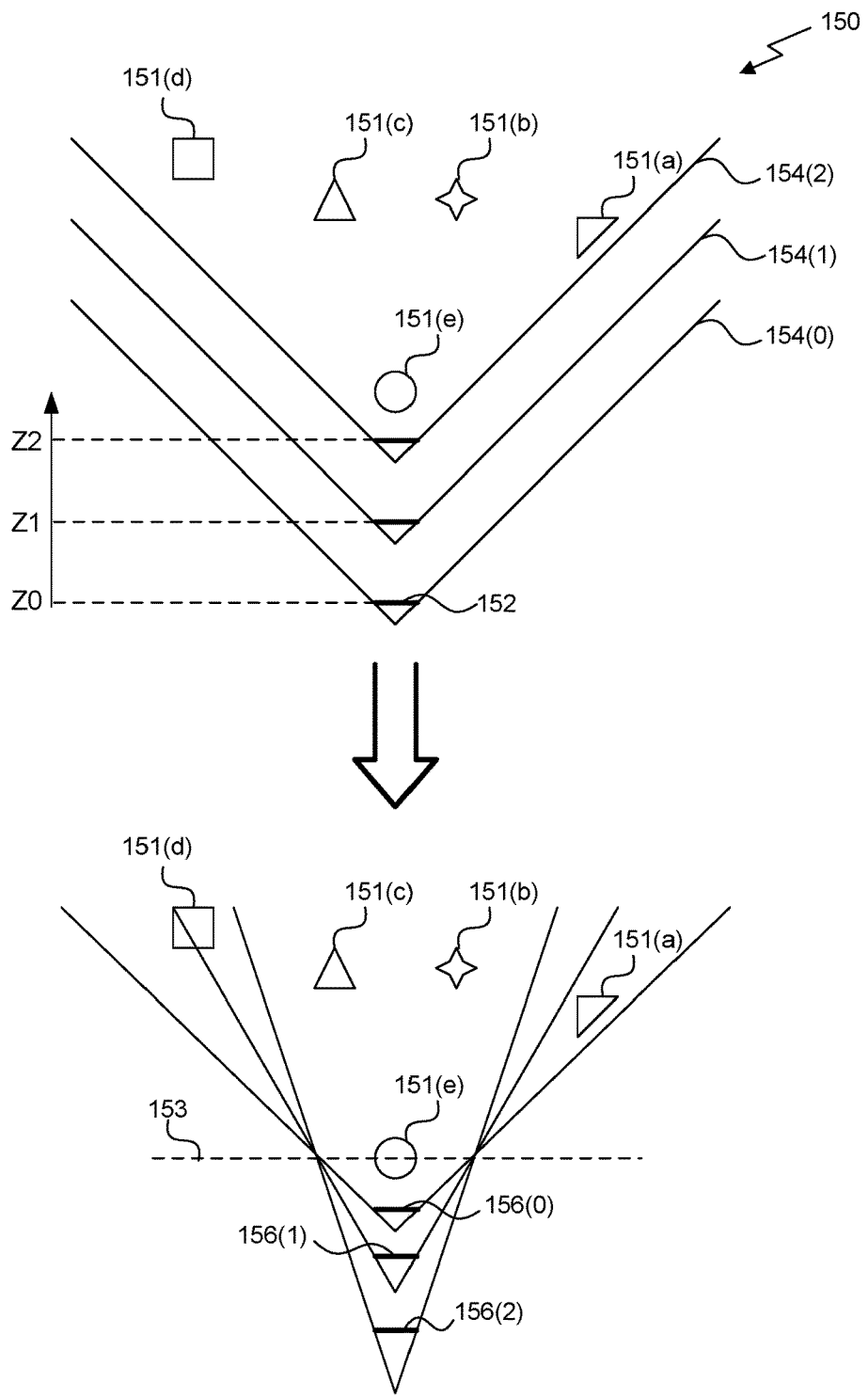
FIG. 1G illustrates capturing a sequence of images of a physical 3D scene and generating a computational zoom image of the physical 3D scene, in accordance with one embodiment.

FIG. 1G illustrates capturing a sequence of images of a physical 3D scene 150 and generating a computational zoom image of the 3D scene, in accordance with one embodiment. As shown, the 3D scene 150 includes objects 151(a)-151(e). The sequence of images is captured by a camera 152 at locations Z0, Z1, Z2. At location Z0, the camera 152 generates an image according to a view frustum 154(0), at location Z1, the camera 152 generates an image according to a view frustum 154(1), and so forth. The camera 152 may be a conventional camera, a stereo camera, or any technically feasible multi-module, multi-capture camera. In one embodiment, a processing unit is configured to generate 3D information comprising a digital model of the real 3D scene 150 from the sequence of images of the physical 3D scene. For example, the processing unit may perform structure from motion techniques for constructing the 3D information. Once the 3D information is generated, different resulting images may be generated from multiple cameras 156 having varying focal lengths and positions. In one embodiment, the position and focal length of each camera 156 are selected so each frustum for each camera 156 intersects a first surface 153, and resulting images may depict foreground object 151(*e*) as having the same size within the different resulting images.

In one embodiment, the at least two images of step 112 in the method 110 are provided from the sequence of images captured by the camera 152. Furthermore, generating different resulting images for a given camera 156 having a position and/or focal length that are different compared with the camera 152 may be performed at step 118 of the method 110.

In various embodiments, methods 100 and 110 may implement a "vertigo zoom" or "dolly zoom" effect, with first surface 123 serving as a size invariant zoom plane or "dolly plane". A video sequence depicting a dolly zoom effect may be generated by selecting a sequence of camera positions and corresponding focal lengths to maintain a constant zoom level at the first surface 123 when viewing the 3D information. For example, a capture sequence may be performed using a hand-held video camera or mobile device configured to provide video capture capability for a hand-held dolly zoom effect. The capture sequence may be used to generate 3D information for a physical scene such as physical 3D scene 150, and a video sequence may be generated from the 3D information and capture sequence. The video sequence may include specified zoom relationships for objects at different distances from the camera. In one embodiment, the video sequence may include a sequence of frames generated by applying homography to portions of images from frames in the capture sequence, the portions being selected according to estimated depth of constituent pixels or regions. In such an embodiment, the 3D information comprises at least a set of images associated with the capture sequence and an estimated camera position for each image within the set of images. Furthermore, the 3D information may comprise estimated depth for each pixel and/or region of each image. A homography may be generated according to an estimated camera position associated with a frame in the capture sequence and a target camera position for a frame of the video sequence. Using a hand-held device to record the capture sequence advantageously eliminates the need for camera rails, a dolly, and specialized zoom and movement servo systems associated with conventional production techniques for dolly zoom sequences. Furthermore, applying the presently disclosed techniques to conventionally captured video sequence data for a dolly zoom may provide greater post-production flexibility than conventional post-production systems provide.

In one embodiment selective zoom may be performed wherein the sequence of images captured by a camera 152 is used to generate a resulting image with variable zoom applied to a selected object. Zoom may be specified, for example, using a pinch gesture. Zoom may be specified independently for a selected object and background objects. Furthermore, a sequence of resulting images may be generated and displayed in real time to track the pinch gesture.

In another embodiment, focal-length corrected copy paste may be performed to allow a user to copy an object from one scene and past the object into another scene. In focal-length corrected copy paste, two different stacks of images from two different 3D scenes may be processed to generate a set of 3D information for each of the two different 3D scenes. An object represented in one set of 3D information may be copied and pasted into a different set of 3D information. In this way, a user may copy an object form one scene and paste the object into a different scene. Sizing of the pasted object may be correlated with the second scene scale, or a user may adjust the scale of the pasted object. In one application of such an embodiment, a user may touch to select an object, copy the object from one scene (source scene), and paste the object into another scene (target scene). Furthermore, the user may use a pinch or swipe gesture to size the pasted object, position the pasted object, adjust perspective around the pasted object, or any combination thereof. In one embodiment, the pasted object may be re-illuminated to match illumination conditions in the target scene. For example, white balance for ambient illumination in the source scene may not match white balance for ambient illumination in the target scene. In such an example, the pasted object may be re-illuminated to compensate for mismatched ambient white balance. Other examples of re-illumination include compensating for shadows cast on the pasted object and direction of illumination for the pasted object. Any technically feasible technique may be implemented to perform focal-length corrected copy paste and/or re-illumination without departing the scope and spirit of embodiments disclosed herein.

In yet another embodiment, depth-independent and space-independent dolly zoom effects may be performed using the presently disclosed techniques. For example, in physical 3D scene 150, object 151(*e*) and object 151(*d*) may be displayed to have a first zoom relative to other objects 151. Object 151(*e*) and object 151(*d*) may be displayed, for example, to have consistent size while objects 151(*a*)-151(*c*) vary in size (e.g., zoomed in or zoomed out). Alternatively, objects 151(*a*)-151(*c*) may be displayed to have consistent size while object 151(*e*) and object 151(*d*) vary in size. The above effects may be achieved by applying an appropriate view volume to a camera 156.

In an alternative embodiment of depth-independent and space-independent dolly zoom effects, 3D information for a scene comprises a digital model of a synthetic scene, and the view volume is applied to a camera object configured to facilitate rendering of the synthetic scene. The view volume may be applied using any technically feasible technique, such as through an application programming interface (API) function call or method call, an object message, and the like.

In one embodiment, techniques disclosed herein may be performed to generate computational tilt-shift lens effects, including focus and perspective distortion effects. For example, the first surface 123, the second surface 141, the third surface 145, or a combination of one or more thereof may be tilted, curved, or otherwise configured to be non-parallel planar surfaces with respect to a camera view plane to produce various effects.

In certain embodiments, configuring a view volume may be performed by user interface functions of a mobile device. For example, a user may select a region of an image to identify an object at a selected depth, such as to specify a depth for the first surface 123. The user may then use a pinch-in or pinch-out user interface gesture to adjust zoom for objects behind the selected depth, or alternatively, objects in front of the selected depth. The user may use a swipe gesture to tilt first surface 123 to an off-parallel position or move the first surface 123 closer or further in depth relative to the mobile device screen. The user may tap on an object to select the object. Depth, color, or a combination of depth and color may be used to segment an object out of other 3D information, thereby allowing specific selection of distinct objects within a scene. The user may select such a distinct object when performing copy-paste operations on objects, such as to copy-paste an object from one scene into another scene.

The above techniques may be implemented using any technically feasible computing platform, such as a mobile device. Furthermore, any technically feasible processing unit within the mobile device may be configured to perform the techniques disclosed herein, including methods 100 and 110. Exemplary processing units and computing platforms are described in further detail below in FIGS. 2-5.

Figure 2:
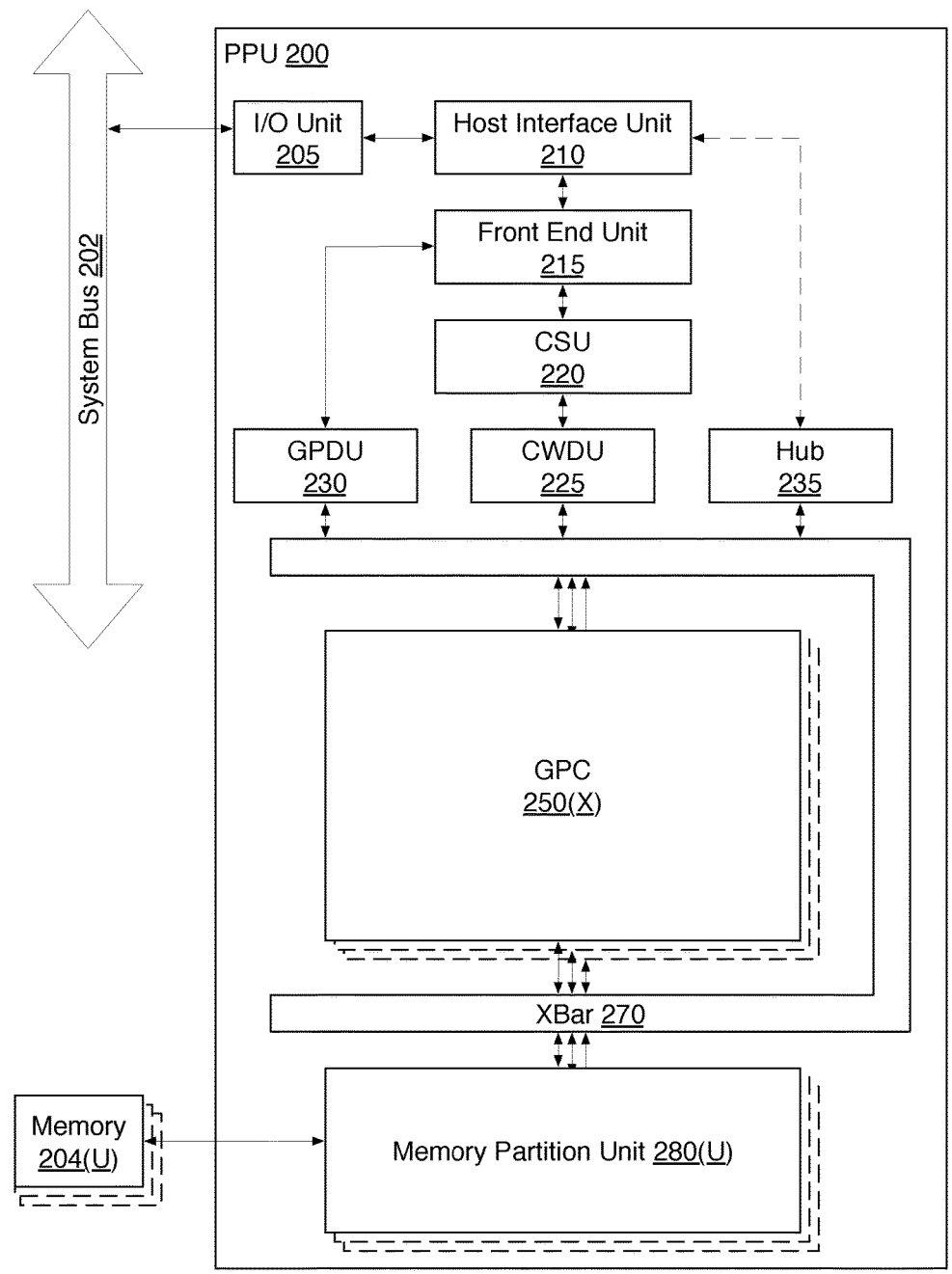
FIG. 2 illustrates a parallel processing unit, in accordance with one embodiment.

FIG. 2 illustrates a parallel processing unit (PPU) 200, in accordance with one embodiment. In one embodiment, the PPU 200 is a multi-threaded processor that is implemented on one or more integrated circuit devices. The PPU 200 is a latency hiding architecture designed to process a large number of threads in parallel. A thread (i.e., a thread of execution) is an instantiation of a set of instructions configured to be executed by the PPU 200. In one embodiment, the PPU 200 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

As shown in FIG. 2, the PPU 200 includes an Input/Output (I/O) unit 205, a host interface unit 210, a front end unit 215, a compute scheduler unit (CSU) 220, a compute work distribution unit (CWDU) 225, a graphics primitive distribution unit (GPDU) 230, a hub 235, a crossbar (Xbar) 270, one or more general processing clusters (GPCs) 250, and one or more memory partition units 280. The PPU 200 may be connected to a host processor or other peripheral devices via a system bus 202. The PPU 200 may also be connected to a local memory comprising a number of memory devices 204. In one embodiment, the local memory may comprise a number of dynamic random access memory (DRAM) devices.

The I/O unit 205 is configured to transmit and receive communications (i.e., commands, data, etc.) from a host processor (not shown) over the system bus 202. The I/O unit 205 may communicate with the host processor directly via the system bus 202 or through one or more intermediate devices such as a memory bridge. In one embodiment, the I/O unit 205 implements a Peripheral Component Interconnect Express (PCIe) interface for communications over a PCIe bus. In alternative embodiments, the I/O unit 205 may implement other types of well-known interfaces for communicating with external devices.

The I/O unit 205 is coupled to a host interface unit 210 that decodes packets received via the system bus 202. In one embodiment, the packets represent commands configured to cause the PPU 200 to perform various operations. The host interface unit 210 transmits the decoded commands to various other units of the PPU 200 as the commands may specify. For example, some commands may be transmitted to the front end unit 215. Other commands may be transmitted to the hub 230 or other units of the PPU 200 such as one or more copy engines, a video encoder, a video decoder, a power management unit, etc. (not explicitly shown). In other words, the host interface unit 210 is configured to route communications between and among the various logical units of the PPU 200.

In one embodiment, a program executed by the host processor encodes a command stream in a buffer that provides workloads to the PPU 200 for processing. A workload may comprise a number of instructions and pointers to data to be processed by those instructions. The buffer is a region in a memory that is accessible (i.e., read/write) by both the host processor and the PPU 200. For example, the host interface unit 210 may be configured to access the buffer in a system memory connected to the system bus 202 via memory requests transmitted over the system bus 202 by the I/O unit 205. In one embodiment, the host processor writes the command stream to the buffer and then transmits a pointer to the start of the command stream to the PPU 200. The host interface unit 210 manages the scheduling of instructions from one or more command streams written by the host processor (i.e., channels) on the various sub-units of the PPU 200.

The front end unit 215 receives instructions from the host interface unit 210 from one or more command streams and forwards those instructions to the correct sub-unit of the PPU 200. Instructions associated with a compute pipeline may be received by the front end unit 215. These compute instructions are then forwarded to a compute scheduler unit 220. The compute scheduler unit 220 is configured to track state information related to the various tasks managed by the compute scheduler unit 220. The state may indicate which GPC 250 a task is assigned to, whether the task is active or inactive, a priority level associated with the task, and so forth. The compute scheduler unit 220 manages the execution of a plurality of tasks on the one or more GPCs 250.

The compute scheduler unit 220 is coupled to a compute work distribution unit 225 that is configured to dispatch tasks for execution on the GPCs 250. The compute work distribution unit 225 may track a number of scheduled tasks received from the compute scheduler unit 220. In one embodiment, the compute work distribution unit 225 manages a pending task pool and an active task pool for each of the GPCs 250. The pending task pool may comprise a number of slots (e.g., 16 slots) that contain tasks assigned to be processed by a particular GPC 250. The active task pool may comprise a number of slots (e.g., 4 slots) for tasks that are actively being processed by the GPCs 250. As a GPC 250 finishes the execution of a task, that task is evicted from the active task pool for the GPC 250 and one of the other tasks from the pending task pool is selected and scheduled for execution on the GPC 250. If an active task has been idle on the GPC 250, such as while waiting for a data dependency to be resolved, then the active task may be evicted from the GPC 250 and returned to the pending task pool while another task in the pending task pool is selected and scheduled for execution on the GPC 250.

Returning to the front end unit 215, instructions associated with a graphics pipeline may be received by the front end unit 215. These graphics instructions are then forwarded to a graphics primitive distribution unit 230. The graphics primitive distribution unit 230 fetches vertex data from the memory 204 or the system memory via the system bus 202 for various graphics primitives. Graphics primitives may include points, lines, triangles, quads, triangle strips, and the like. The graphics primitive distribution unit 230 groups the vertices into batches of primitives and dispatches tasks to the GPCs 250 for processing the batches of primitives. Processing may involve executing a shader (i.e., a Vertex Shader, Tesselation Shader, Geometry Shader, etc.) on a programmable processing unit as well as performing fixed function operations on the vertices such as clipping, culling, and viewport transformation using a fixed function unit.

The compute work distribution unit 225 and the graphics primitive distribution unit 230 communicate with the one or more GPCs 250 via a XBar 270. The XBar 270 is an interconnect network that couples many of the units of the PPU 200 to other units of the PPU 200. For example, the XBar 270 may be configured to couple the compute work distribution unit 225 to a particular GPC 250. Although not shown explicitly, one or more other units of the PPU 200 are coupled to the host unit 210. The other units may also be connected to the XBar 270 via a hub b.

The tasks associated with the compute pipeline are managed by the compute scheduler unit 220 and dispatched to a GPC 250 by the compute work distribution unit 225. The tasks associated with the graphics pipeline are managed and distributed to a GPC 250 by the graphics primitive distribution unit 230. The GPC 250 is configured to process the tasks and generate results. The results may be consumed by other tasks within the GPC 250, routed to a different GPC 250 via the XBar 270, or stored in the memory 204. The results can be written to the memory 204 via the memory partition units 280, which implement a memory interface for reading and writing data to/from the memory 204. In one embodiment, the PPU 200 includes a number U of memory partition units 280 that is equal to the number of separate and distinct memory devices 204 coupled to the PPU 200. A memory partition unit 280 will be described in more detail below in conjunction with FIG. 3B.

In one embodiment, a host processor executes a driver kernel that implements an application programming interface (API) that enables one or more applications executing on the host processor to schedule operations for execution on the PPU 200. An application may generate instructions (i.e., API calls) that cause the driver kernel to generate one or more tasks for execution by the PPU 200. The driver kernel outputs tasks to one or more streams being processed by the PPU 200. Each task may comprise one or more groups of related threads, referred to herein as a warp. A thread block may refer to a plurality of groups of threads including instructions to perform the task. Threads in the same group of threads may exchange data through shared memory. In one embodiment, a group of threads comprises 32 related threads.

Figure 3A:
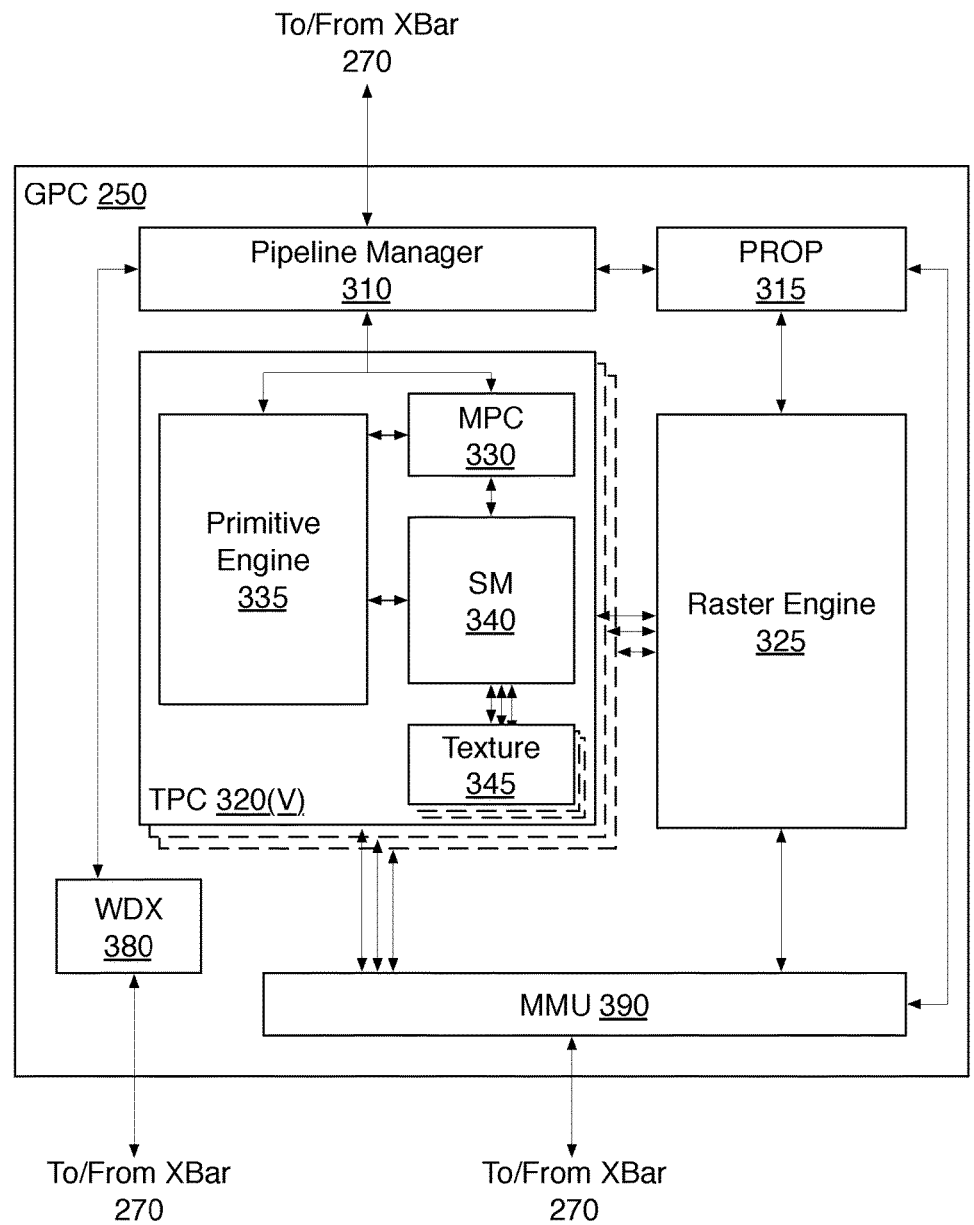
FIG. 3A illustrates a general processing cluster of the parallel processing unit of FIG. 2, in accordance with one embodiment.

FIG. 3A illustrates a GPC 250 of the PPU 200 of FIG. 2, in accordance with one embodiment. As shown in FIG. 3A, each GPC 250 includes a number of hardware units for processing tasks. In one embodiment, each GPC 250 includes a pipeline manager 310, a pre-raster operations unit (PROP) 315, a raster engine 325, a work distribution crossbar (WDX) 380, a memory management unit (MMU) 390, and one or more Texture Processing Clusters (TPCs) 320. It will be appreciated that the GPC 250 of FIG. 3A may include other hardware units in lieu of or in addition to the units shown in FIG. 3A.

In one embodiment, the operation of the GPC 250 is controlled by the pipeline manager 310. The pipeline manager 310 manages the configuration of the one or more TPCs 320 for processing tasks allocated to the GPC 250. In one embodiment, the pipeline manager 310 may configure at least one of the one or more TPCs 320 to implement at least a portion of a graphics rendering pipeline. For example, a TPC 320 may be configured to execute a vertex shader program on the programmable streaming multiprocessor (SM) 340. The pipeline manager 310 may also be configured to route packets received from the Xbar 270 to the appropriate logical units within the GPC 250. For example, some packets may be routed to fixed function hardware units in the PROP 315 and/or raster engine 325 while other packets may be routed to the TPCs 320 for processing by the primitive engine 335 or the SM 340.

The PROP unit 315 is configured to route data generated by the raster engine 325 and the TPCs 320 to a Raster Operations (ROP) unit in the memory partition unit 280, described in more detail below. The PROP unit 315 may also be configured to perform optimizations for color blending, organize pixel data, perform address translations, and the like.

The raster engine 325 includes a number of fixed function hardware units configured to perform various raster operations. In one embodiment, the raster engine 325 includes a setup engine, a course raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine may be transmitted to the culling engine where fragments associated with the primitive that fail a z-test are culled, and transmitted to a clipping engine where fragments lying outside a viewing frustum are clipped. Those fragments that survive clipping and culling may be passed to a fine raster engine to generate attributes for the pixel fragments based on the plane equations generated by the setup engine. The output of the raster engine 380 comprises fragments to be processed, for example, by a fragment shader implemented within a TPC 320.

Each TPC 320 included in the GPC 250 includes an M-Pipe Controller (MPC) 330, a primitive engine 335, an SM 340, and one or more texture units 345. The MPC 330 controls the operation of the TPC 320, routing packets received from the pipeline manager 310 to the appropriate units in the TPC 320. For example, packets associated with a vertex may be routed to the primitive engine 335, which is configured to fetch vertex attributes associated with the vertex from the memory 204. In contrast, packets associated with a shader program may be transmitted to the SM 340.

In one embodiment, the texture units 345 are configured to load texture maps (e.g., a 2D array of texels) from the memory 204 and sample the texture maps to produce sampled texture values for use in shader programs executed by the SM 340. The texture units 345 implement texture operations such as filtering operations using mip-maps (i.e., texture maps of varying levels of detail). In one embodiment, each TPC 320 includes two (2) texture units 345.

The SM 340 comprises a programmable streaming processor that is configured to process tasks represented by a number of threads. Each SM 340 is multi-threaded and configured to execute a plurality of threads (e.g., 32 threads) from a particular group of threads concurrently. In one embodiment, the SM 340 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 340 implements a SIMT (Single-Instruction, Multiple Thread) architecture where each thread in a group of threads is configured to process a different set of data based on the same set of instructions, but where individual threads in the group of threads are allowed to diverge during execution. In other words, when an instruction for the group of threads is dispatched for execution, some threads in the group of threads may be active, thereby executing the instruction, while other threads in the group of threads may be inactive, thereby performing a no-operation (NOP) instead of executing the instruction. The SM 340 may be described in more detail below in conjunction with FIG. 4.

The MMU 390 provides an interface between the GPC 250 and the memory partition unit 280. The MMU 390 may provide translation of virtual addresses into physical addresses, memory protection, and arbitration of memory requests. In one embodiment, the MMU 390 provides one or more translation lookaside buffers (TLBs) for improving translation of virtual addresses into physical addresses in the memory 204.

Figure 3B:
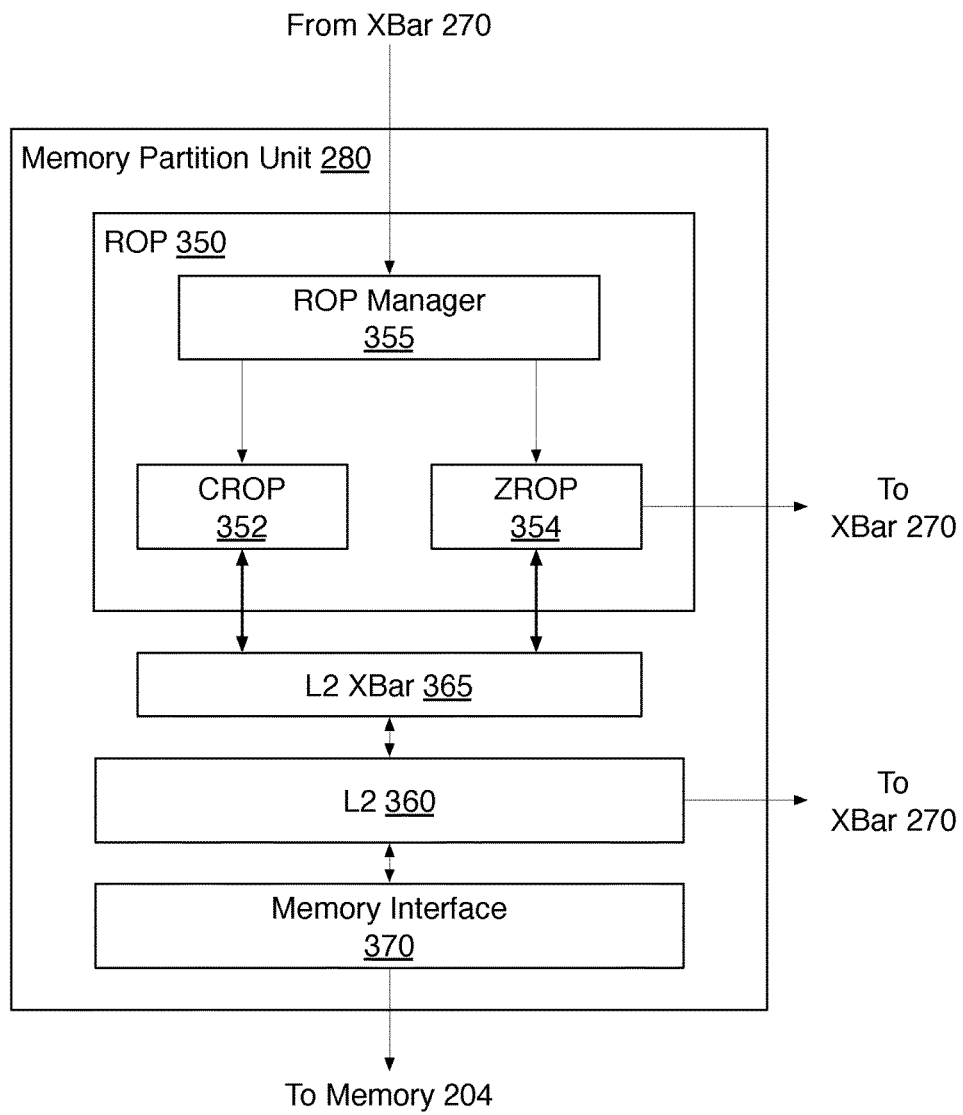
FIG. 3B illustrates a partition unit of the parallel processing unit of FIG. 2, in accordance with one embodiment.

FIG. 3B illustrates a memory partition unit 280 of the PPU 200 of FIG. 2, in accordance with one embodiment. As shown in FIG. 3B, the memory partition unit 280 includes a Raster Operations (ROP) unit 350, a level two (L2) cache 360, a memory interface 370, and an L2 crossbar (XBar) 365. The memory interface 370 is coupled to the memory 204. Memory interface 370 may implement 16, 32, 64, 128-bit data buses, or the like, for high-speed data transfer. In one embodiment, the PPU 200 comprises U memory interfaces 370, one memory interface 370 per memory partition unit 280, where each memory partition unit 280 is connected to a corresponding memory device 204. For example, PPU 200 may be connected to up to U memory devices 204, such as graphics double-data-rate, version 5, synchronous dynamic random access memory (GDDR5 SDRAM). In one embodiment, the memory interface 370 implements a DRAM interface and U is equal to 6.

In one embodiment, the PPU 200 implements a multi-level memory hierarchy. The memory 204 is located off-chip in SDRAM coupled to the PPU 200. Data from the memory 204 may be fetched and stored in the L2 cache 360, which is located on-chip and is shared between the various GPCs 250. As shown, each memory partition unit 280 includes a portion of the L2 cache 360 associated with a corresponding memory device 204. Lower level caches may then be implemented in various units within the GPCs 250. For example, each of the SMs 340 may implement a level one (L1) cache. The L1 cache is private memory that is dedicated to a particular SM 340. Data from the L2 cache 360 may be fetched and stored in each of the L1 caches for processing in the functional units of the SMs 340. The L2 cache 360 is coupled to the memory interface 370 and the XBar 270.

The ROP unit 350 includes a ROP Manager 355, a Color ROP (CROP) unit 352, and a Z ROP (ZROP) unit 354. The CROP unit 352 performs raster operations related to pixel color, such as color compression, pixel blending, and the like. The ZROP unit 354 implements depth testing in conjunction with the raster engine 325. The ZROP unit 354 receives a depth for a sample location associated with a pixel fragment from the culling engine of the raster engine 325. The ZROP unit 354 tests the depth against a corresponding depth in a depth buffer for a sample location associated with the fragment. If the fragment passes the depth test for the sample location, then the ZROP unit 354 updates the depth buffer and transmits a result of the depth test to the raster engine 325. The ROP Manager 355 controls the operation of the ROP unit 350. It will be appreciated that the number of memory partition units 280 may be different than the number of GPCs 250 and, therefore, each ROP unit 350 may be coupled to each of the GPCs 250. Therefore, the ROP Manager 355 tracks packets received from the different GPCs 250 and determines which GPC 250 that a result generated by the ROP unit 350 is routed to. The CROP unit 352 and the ZROP unit 354 are coupled to the L2 cache 360 via an L2 XBar 365.

Figure 4:
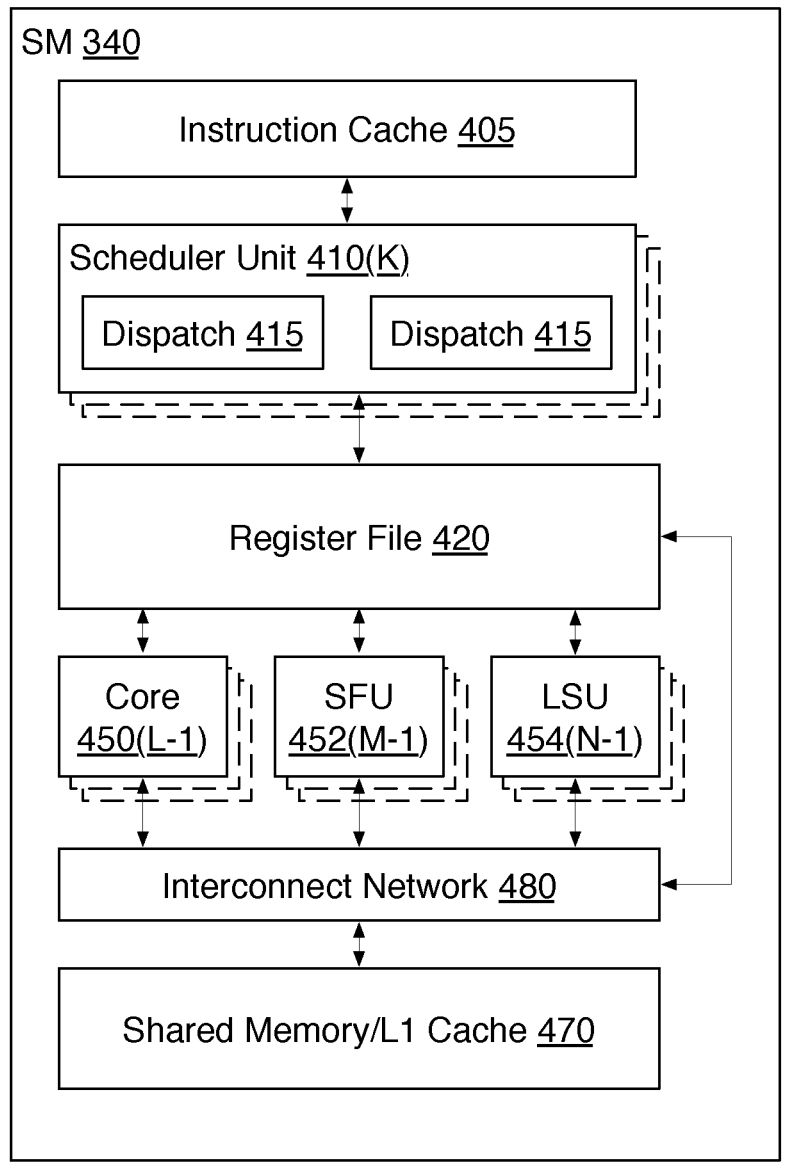
FIG. 4 illustrates the streaming multi-processor of FIG. 3A, in accordance with one embodiment.

FIG. 4 illustrates the streaming multi-processor 340 of FIG. 3A, in accordance with one embodiment. As shown in FIG. 4, the SM 340 includes an instruction cache 405, one or more scheduler units 410, a register file 420, one or more processing cores 450, one or more special function units (SFUs) 452, one or more load/store units (LSUs) 454, an interconnect network 480, and a shared memory/L1 cache 470.

As described above, the compute work distribution unit 225 and the graphics primitive distribution unit 230 dispatch tasks for execution on the GPCs 250 of the PPU 200. The tasks are allocated to a particular TPC 320 within a GPC 250 and, if the task is associated with a shader program, the task may be allocated to an SM 340. A scheduler unit 410 receives the tasks from the compute work distribution unit 225 and the graphics primitive distribution unit 230 and manages instruction scheduling for one or more groups of threads (i.e., warps) assigned to the SM 340. Each SM 340 may include K scheduler units 410 (i.e., 410(0) . . . 410(K−1)). The scheduler unit 410 schedules threads for execution in groups of parallel threads, where each group is called a warp. In one embodiment, each warp includes 32 threads. The scheduler unit 410 may manage a plurality of different warps, scheduling the warps for execution and then dispatching instructions from the plurality of different warps to the various functional units (i.e., cores 350, SFUs 352, and LSUs 354) during each clock cycle.

In one embodiment, each scheduler unit 410 includes one or more instruction dispatch units 415. Each dispatch unit 415 is configured to transmit instructions to one or more of the functional units. In the embodiment shown in FIG. 4, the scheduler unit 410 includes two dispatch units 415 that enable two different instructions from the same warp to be dispatched during each clock cycle. In alternative embodiments, each scheduler unit 410 may include a single dispatch unit 415 or additional dispatch units 415.

Each SM 340 includes a register file 420 that provides a set of registers for the functional units of the SM 340. In one embodiment, the register file 420 is divided between each of the functional units such that each functional unit is allocated a dedicated portion of the register file 420. In another embodiment, the register file 420 is divided between the different warps being executed by the SM 340. The register file 420 provides temporary storage for operands connected to the data paths of the functional units.

Each SM 340 comprises L processing cores 450 (i.e., 450(0) . . . 450(L−1)). In one embodiment, the SM 340 includes a large number (e.g., 192, etc.) of distinct processing cores 450. Each core 450 may include a fully-pipelined, single-precision processing unit that includes a floating point arithmetic logic unit and an integer arithmetic logic unit. The core 450 may also include a double-precision processing unit including a floating point arithmetic logic unit. In one embodiment, the floating point arithmetic logic units implement the IEEE 754-2008 standard for floating point arithmetic. Each SM 340 also comprises M SFUs 452 (i.e., 452(0) . . . 452(M−1)) that perform special functions (e.g., pixel blending operations, and the like), and N LSUs 454 (i.e., 454(0) . . . 454(N−1)) that implement load and store operations between the shared memory/L1 cache 470 and the register file 420. In one embodiment, the SM 340 includes 192 cores 450, 32 SFUs 452, and 32 LSUs 454.

Each SM 340 includes an interconnect network 480 that connects each of the functional units to the register file 420 and the shared memory/L1 cache 470. In one embodiment, the interconnect network 480 is a crossbar that can be configured to connect any of the functional units to any of the registers in the register file 420 or the memory locations in shared memory/L1 cache 470.

The shared memory/L1 cache 470 is an array of on-chip memory that, in one embodiment, may be configured as either shared memory or an L1 cache, or a combination of both, as the application demands. For example, the shared memory/L1 cache 470 may comprise 64 kB of storage capacity. The shared memory/L1 cache 470 may be configured as 64 kB of either shared memory or L1 cache, or a combination of the two such as 16 kB of L1 cache and 48 kB of shared memory.

The PPU 200 described above may be configured to perform highly parallel computations much faster than conventional CPUs. Parallel computing has advantages in graphics processing, data compression, biometrics, stream processing algorithms, and the like.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display).

An application writes model data for a scene (i.e., a collection of vertices and attributes) to a memory such as a system memory or memory 204. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 340 of the PPU 200 including one or more of a vertex shader, hull shader, domain shader, geometry shader, and a pixel shader. For example, one or more of the SMs 340 may be configured to execute a vertex shader program that processes a number of vertices defined by the model data. In one embodiment, the different SMs 340 may be configured to execute different shader programs concurrently. For example, a first subset of SMs 340 may be configured to execute a vertex shader program while a second subset of SMs 340 may be configured to execute a pixel shader program. The first subset of SMs 340 processes vertex data to produce processed vertex data and writes the processed vertex data to the L2 cache 360 and/or the memory 204. After the processed vertex data is rasterized (i.e., transformed from three-dimensional data into two-dimensional data in screen space) to produce fragment data, the second subset of SMs 340 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Figure 5:
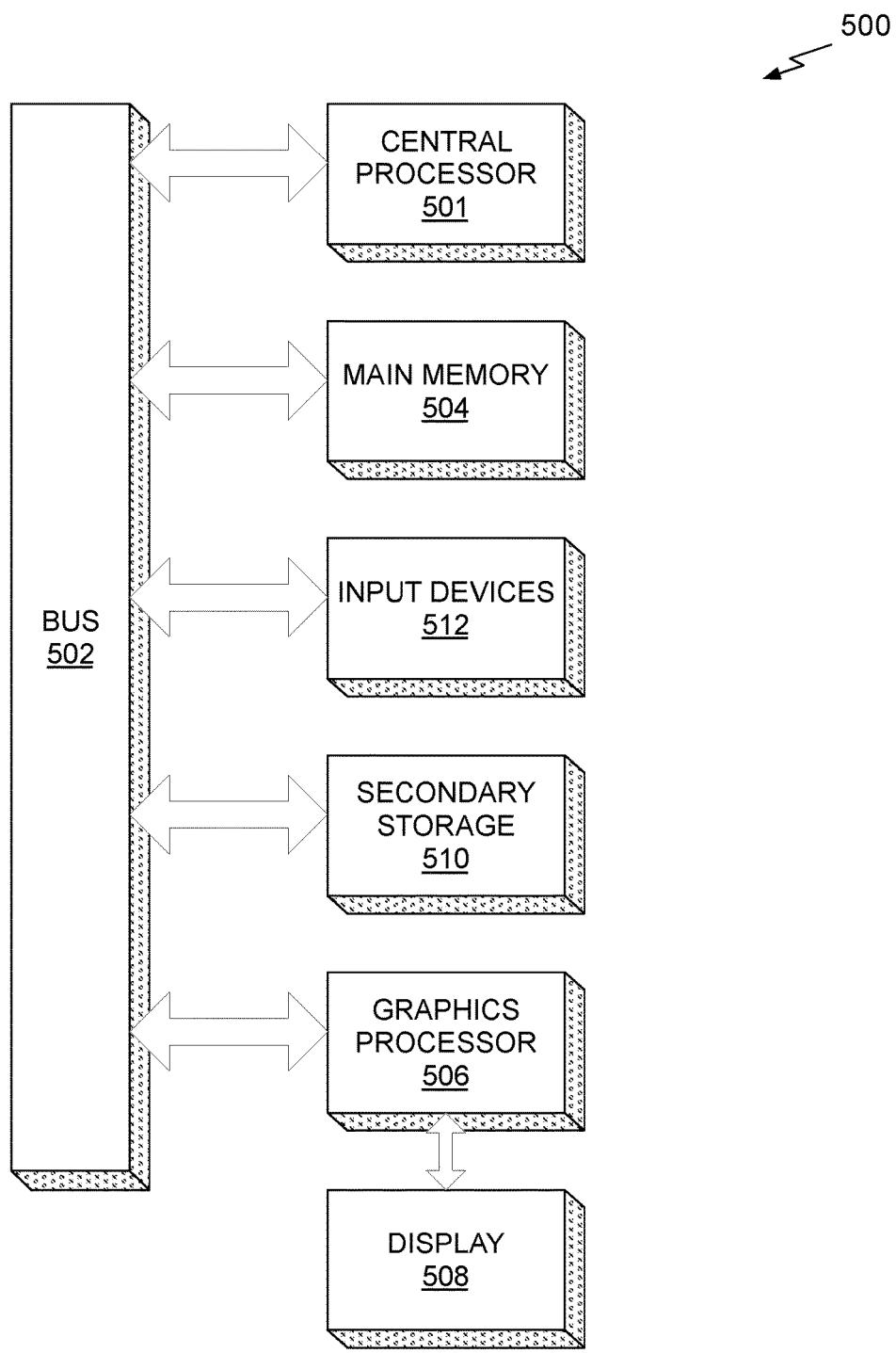
FIG. 5 illustrates an exemplary system in which the various architecture and/or functionality of the various previous embodiments may be implemented.

FIG. 5 illustrates an exemplary system 500 in which the various architecture and/or functionality of the various previous embodiments may be implemented. As shown, a system 500 is provided including at least one central processor 501 that is connected to a communication bus 502. The communication bus 502 may be implemented using any suitable protocol, such as PCI (Peripheral Component Interconnect), PCI-Express, AGP (Accelerated Graphics Port), HyperTransport, or any other bus or point-to-point communication protocol(s). The system 500 also includes a main memory 504. Control logic (software) and data are stored in the main memory 504 which may take the form of random access memory (RAM).

The system 500 also includes input devices 512, a graphics processor 506, and a display 508, i.e. a conventional CRT (cathode ray tube), LCD (liquid crystal display), LED (light emitting diode), plasma display or the like. User input may be received from the input devices 512, e.g., keyboard, mouse, touchpad, microphone, and the like. In one embodiment, the graphics processor 506 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 500 may also include a secondary storage 510. The secondary storage 510 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 504 and/or the secondary storage 510. Such computer programs, when executed, enable the system 500 to perform various functions. The memory 504, the storage 510, and/or any other storage are possible examples of computer-readable media.

In one embodiment, the architecture and/or functionality of the various previous figures may be implemented in the context of the central processor 501, the graphics processor 506, an integrated circuit (not shown) that is capable of at least a portion of the capabilities of both the central processor 501 and the graphics processor 506, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 500 may take the form of a desktop computer, laptop computer, server, workstation, game consoles, embedded system, and/or any other type of logic. Still yet, the system 500 may take the form of various other devices including, but not limited to a personal digital assistant (PDA) device, a mobile phone device, a television, etc.

Further, while not shown, the system 500 may be coupled to a network (e.g., a telecommunications network, local area network (LAN), wireless network, wide area network (WAN) such as the Internet, peer-to-peer network, cable network, or the like) for communication purposes.

In one embodiment, methods 100 and 110 are implemented as a software product comprising programming instructions stored within non-transitory computer readable medium that may be executed by one or more processing units, such as central processor 501 or graphics processor 506. In one embodiment, graphics processor 506 is implemented according to FIGS. 2-4.

While various embodiments have been described above, it should be understood that they have been presented by way of example only, and not limitation. Thus, the breadth and scope of the present application should not be limited by any of the above-described exemplary embodiments, but should be defined only in accordance with the following and later-submitted claims and their equivalents.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
identifying a first surface within a three-dimensional (3D) scene, wherein the 3D scene includes a first set of 3D objects located within a first depth range of the 3D scene and a second set of 3D objects located within a second depth range of the 3D scene, and 3D information defines the first set of 3D objects and the second set of 3D objects;
projecting, by a processing unit, the first set of 3D objects onto the first surface according to a first projection mapping specified by a first focal length to produce a first portion of image components;
projecting, by the processing unit, the second set of 3D objects onto the first surface according to a second projection mapping specified by a second focal length to produce a second portion of image components; and
generating, by the processing unit, a first resulting image comprising the first portion of image components according to the first focal length and the second portion of image components according to the second focal length based on a camera projection from the first surface to a camera view plane.

2. The method of claim 1, wherein the first depth range is bounded by the camera view plane and the first surface.

3. The method of claim 1, further comprising:
receiving at least two images of the 3D scene;
obtaining depth map information for the at least two images; and
generating the 3D information based on the at least two images and the at least two depth maps.

4. The method of claim 3, wherein the at least two images comprise different video frames in a sequence of video frames captured by a digital camera.

5. The method of claim 3, wherein the at least two images comprise images rendered by a 3D rendering system.

6. The method of claim 1, wherein the 3D information defines a third set of 3D objects within a third depth range, and further comprising:
identifying a second surface within the 3D scene;
projecting the third set of 3D objects onto the second surface according to a third projection mapping to produce a third portion of image components; and
mapping the second surface into the 3D information.

7. The method of claim 6, wherein identifying the second surface comprises locating the second surface at a specified offset from the first surface.

8. The method of claim 1, wherein a view volume defines a portion of the 3D scene within a field of view for the camera view plane, the view volume comprising a near portion of a first view frustum and a far portion of a second view frustum.

9. The method of claim 1, wherein the first depth range and the second depth range are measured as a projection from the camera view plane into the 3D scene.

10. The method of claim 1, wherein identifying the first surface comprises determining a depth value for the first surface based on a specified screen location.

11. The method of claim 10, wherein the first surface comprises a plane that is parallel to the camera view plane.

12. The method of claim 10, further comprising adjusting the depth value for the first surface in response to a user interface input.

13. The method of claim 1, wherein at least one of the first projection mapping and the second projection mapping is specified in response to a user interface input.

14. The method of claim 1, wherein at least one of the first projection mapping and the second projection mapping comprises a homography operator.

15. The method of claim 1, further comprising generating a second resulting image according to a modified second projection mapping.

16. A non-transitory computer-readable storage medium storing instructions that, when executed by a processor, cause the processor to:
identify a first surface within a three-dimensional (3D) scene, wherein the 3D scene includes a first set of 3D objects located within a first depth range of the 3D scene and a second set of 3D objects located within a second depth range of the 3D scene, and 3D information defines the first set of 3D objects and the second set of 3D objects;
project the first set of 3D objects onto the first surface according to a first projection mapping specified by a first focal length to produce a first portion of image components;
project the second set of 3D objects onto the first surface according to a second projection mapping specified by a second focal length to produce a second portion of image components; and
generate a first resulting image comprising the first portion of image components according to the first focal length and the second portion of image components according to the second focal length based on a camera projection from the first surface to a camera view plane.

17. The non-transitory computer-readable storage medium of claim 16, further comprising instructions that, when executed by a processor, cause the processor to:

receive at least two images of the 3D scene;

obtain depth map information for the at least two images; and generate the 3D information based on the at least two images and the at least two depth maps.

18. A system, comprising:

a display device;

a touch input device;

a digital camera module;

a processing unit coupled to the display device, the touch input device, and the digital camera module, the processing unit configured to:

identify a first surface within a three-dimensional (3D) scene, wherein the 3D scene includes a first set of 3D objects located within a first depth range of the 3D scene and a second set of 3D objects located within a second depth range of the 3D scene, and 3D information defines the first set of 3D objects and the second set of 3D objects;

project the first set of 3D objects onto the first surface according to a first projection mapping specified by a first focal length to produce a first portion of image components;

project the second set of 3D objects onto the first surface according to a second projection mapping specified by a second focal length to produce a second portion of image components; and generate a first resulting image comprising the first portion of image components according to the first focal length and the second portion of image components according to the second focal length based on a camera projection from the first surface to a camera view plane.

19. The system of claim 18, wherein the processing unit is further configured to:

receive at least two images of the 3D scene;

obtain depth map information for the at least two images; and generate the 3D information based on the at least two images and the at least two depth maps, wherein the at least two images comprise different video frames captured by the digital camera module.

20. The system of claim 18, wherein the 3D information defines a third set of 3D objects within a third depth range, and the processing unit is further configured to:

identify a second surface within the 3D scene;

project the third set of 3D objects onto the second surface according to a third projection mapping to produce a third portion of image components; and map the second surface into the 3D information, based on user input detected by the touch input device.

* * * * *